(12) United States Patent
Lin

(10) Patent No.: US 9,206,917 B2
(45) Date of Patent: Dec. 8, 2015

(54) POSITIONING STRUCTURE OF WATER GUIDING DUCT IN FAUCET VALVE BASE

(71) Applicant: Wen-Tsung Lin, Changhua (TW)

(72) Inventor: Wen-Tsung Lin, Changhua (TW)

(73) Assignee: Hsue Sam Enterprise Co. Ltd., Changhua (TW)

( * ) Notice: Subject to any disclaimer, the term of this patent is extended or adjusted under 35 U.S.C. 154(b) by 159 days.

(21) Appl. No.: 14/155,228

(22) Filed: Jan. 14, 2014

(65) Prior Publication Data

US 2015/0198259 A1    Jul. 16, 2015

(51) Int. Cl.
*F16K 11/00* (2006.01)
*E03C 1/04* (2006.01)

(52) U.S. Cl.
CPC .................. *F16K 19/006* (2013.01); *E03C 1/04* (2013.01); *E03C 1/0403* (2013.01); *Y10T 137/87579* (2015.04)

(58) Field of Classification Search
CPC ....... F16K 19/006; E03C 1/04; E03C 1/0403; Y10T 137/87579
USPC ....................................................... 137/315.12
See application file for complete search history.

(56) References Cited

U.S. PATENT DOCUMENTS

| | | | | |
|---|---|---|---|---|
| 5,349,987 A * | 9/1994 | Shieh | ............................. | 137/801 |
| 6,123,106 A * | 9/2000 | Benstead | ...................... | 137/801 |
| 6,912,742 B1 * | 7/2005 | Wang | ................................ | 4/695 |
| 2008/0276367 A1 * | 11/2008 | Bares et al. | ....................... | 4/677 |
| 2009/0277520 A1 * | 11/2009 | Wang | ............................ | 137/801 |
| 2010/0326553 A1 * | 12/2010 | Kacik et al. | ..................... | 137/801 |
| 2012/0018009 A1 * | 1/2012 | Veros et al. | ................. | 137/454.2 |
| 2012/0018020 A1 * | 1/2012 | Moore et al. | .................. | 137/798 |
| 2012/0048394 A1 * | 3/2012 | Lin | .......................... | 137/315.01 |
| 2012/0055571 A1 * | 3/2012 | Lin | ............................ | 137/625.4 |

* cited by examiner

*Primary Examiner* — Craig Schneider
*Assistant Examiner* — Kevin Barss
(74) *Attorney, Agent, or Firm* — Che-Yang Chen; Law Office of Michael Chen

(57) ABSTRACT

A water guiding duct positioning structure in a faucet valve base is disclosed, which may include a valve seat, at least two water guiding ducts, and a position limiting member, wherein a valve chamber is located at upper portion of the valve seat to receive a water control valve, and bottom portion of the valve seat is connected with two water inlet tubes and a water outlet tube, which have horizontal slits located at the outer periphery of the water inlet and outlet tubes for the position limiting member to plug in. The water guiding duct has a connector collar, which is installed with a water sealing ring and has at least one ring slot. The position limiting member has a horizontal holding plate, one end of which has a shoulder portion extending both sides from the holding plate.

6 Claims, 11 Drawing Sheets

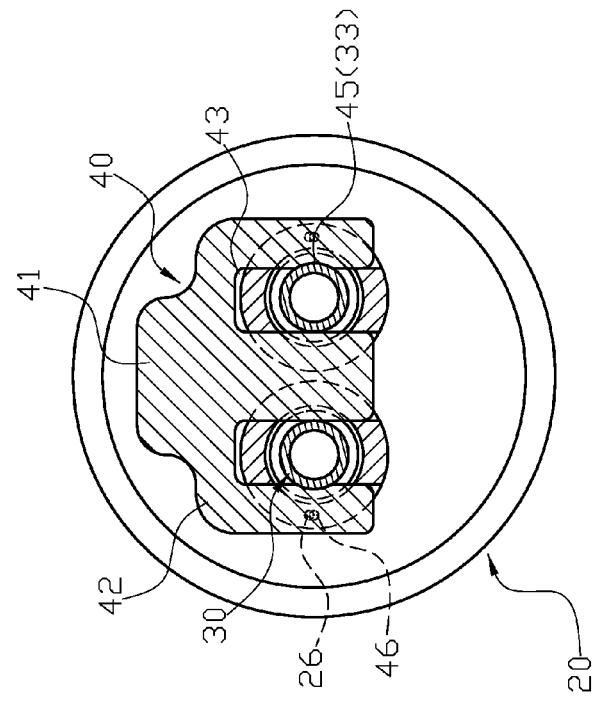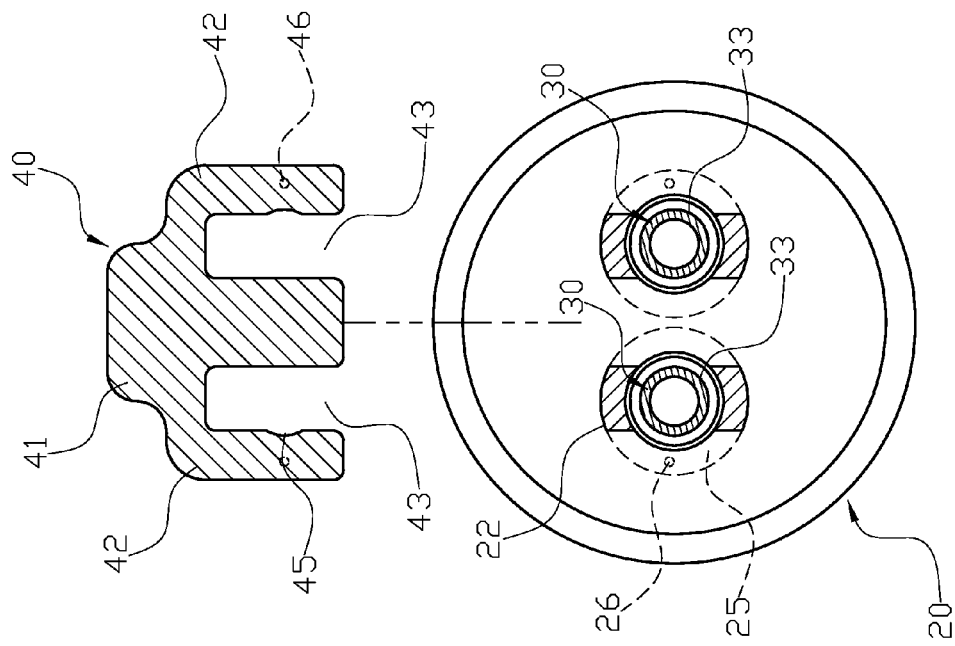
FIG. 10
FIG. 9

POSITIONING STRUCTURE OF WATER GUIDING DUCT IN FAUCET VALVE BASE

FIELD OF INVENTION

The present invention relates to a water guiding duct positioning structure for the valve seat of a water faucet, more particularly to a water guiding duct positioning structure that positions water guiding ducts by a position limiting member that plugs into the slits located at the outer periphery of the water guiding ducts.

BACKGROUND OF THE INVENTION

A conventional water guiding duct positioning structure for the valve seat of a water faucet, as illustrated in FIGS. 10 to 12, comprises a valve seat 50 installed into the bottom portion of a water faucet, wherein the valve seat 50 has at its top portion a vertically placed through hole, the through hole is connected with two water guiding ducts 51, and the water guiding ducts 51 are for connecting to two water inlet tubes 60 with one for cold water and another one for water. The bottom portion of the water valve seat 50 has a through hole 52 which is for interposing a locking bolt 53, and the locking bolt 53 is placed at the same side of the two water guiding ducts 51 and is in close proximity to the two water guiding duct tubes 61. The center portion of the locking bolt 53 has a fixing slot 531 with a depth of about half of the diameter of the locking bolt 53, and the fixing slot 531 is used for holding a fixing pin 54 interposed from the bottom of the valve seat 50, and the fixing pin 54 restricts the locking bolt 53 to rotate within a range of about 180 degrees as a result of the positioning effect of the fixing pin 54. In addition, the locking bolt 53 has at one end a "-"-shaped adjusting member 532 which allows the locking bolt 53 to be rotated with the assistance of an applicable tool. Further, the locking bolt 53 has at its center portion two arc-shaped slots 533 that are located at the same side of the locking bolt 53, with each positioned to fit one of the two water guiding ducts 51. When the locking bolt 53 is rotated to allow the two arc-shaped slots 533 to face the two conduits 51, the arc-shaped surfaces of the arc-shaped slots 533 fit the outer peripheries of the water guiding ducts 51, which allows the water guiding ducts 51 to function at its fully open state as the locking bolt 53 is not pushing the water guiding ducts 51 thereby reducing the functioning radius of the water guiding ducts 51. However, after the locking bolt 53 is rotated in a preset direction for about 180 degree, the center portion of the locking bolt 53 is rotated to a position that a portion of the locking bolt 53 occupies the space that was originally occupied by the outer peripheries of the water guiding ducts 51, therefore the locking bolt 53 pushes against the water guiding ducts 51 to shift to one side and this contact functions to stabilize the positioning of the water guiding ducts 51. The water inlet tubes 60 each has a connector collar 61 at its top end that connects to the water guiding ducts 51 which are located at the bottom portion of the valve seat 50, and the connector collar 61 has an enlarged positioning edge 611 at its top end, which is further connected with a plug connector 62. The plug connector 62 has a concaved ring slot 621 that is located at the outer periphery and is in close proximity to the opening, and the ring slot 621 is equipped with an O-ring 622 to avoid potential water leak. Further, the plug connector 62 has at its outer periphery an arc-shaped concaved position limiting slot 623 that is located below the ring slot 621, therefore as the plug connectors 62 of the water inlet tubes 60 are inserted into the water guiding ducts 51 of the valve seat 50, the positioning edge 611 of the connector collar 61 and the bottom surface of the valve seat 50 become engaged which restricts their mutual dislocation, and the outer periphery of the locking bolt 53 is also interposed into the arc-shaped position limiting slot 623 of the plug connector 61 as illustrated in FIG. 13 for stabilization. The above-mentioned connection structure allows the lock or release of the arc-shaped concaved position limiting slot 623 of the plug connector 62 of the water inlet tubes 60 by rotationally operating the locking bolt 53 with the a "-"-shaped adjusting member 532.

However, the conventional water guiding duct positioning structure as described above has multiple technical problems in practical uses as listed below: (a) as the water inlet tubes 60 are inserted into the water guiding ducts 51 and the locking bolt 53 is placed into the through hole 52, a tool is need to adjust the a "-"-shaped adjusting member 532 to achieve the positioning between the arc-shaped positioning slot 623 of the water inlet tubes 60 and the locking bolt 53 by rotating the locking bolt 53, this process of rotational adjustment is time-consuming, labor-intensive, and is difficult to perform within a limited space this is available underneath a washing table; (b) the locking bolt 53 resists as a straight line against only one side of the arc-shaped positioning slot 623 of the water inlet tubes 60 and does not provide a full circle stabilization to the water inlet tubes 60, therefore the contact area is rather limited and only one small portion of the water inlet tubes may be involved in the stabilization, and as water flows within the water inlet tubes 60 the force generated by the water pressure may cause the water inlet tubes 60 to dislocate and as a result the opening of the water inlet tubes 60 may be moved away from its expected position and causes water leak.

Therefore, there remains a need for a new and improved water guiding duct positioning structure to overcome the problems of conventional water guiding duct positioning structure as described above.

SUMMARY OF THE INVENTION

The present invention provides a novel and improved water guiding duct positioning structure that solves the technical problems of the conventional structures that the conventional water guiding duct structure is difficult to be assembled and causes water leak due to insufficient positioning strength.

The positioning structure of water guiding duct in faucet valve base may include a valve seat located inside of the water faucet, at least two water guiding ducts, and a position limiting member, wherein the top portion of the valve seat is a concaved valve chamber which holds valve control components, the bottom of the valve seat is connected with two water inlet tubes and one water outlet tube, and these water inlet and outlet tubes are connected to the valve chamber, thereby allowing the control of the water flow and the water temperature by adjusting the flow rate of water from the hot and cold water inlet tubes by manipulating the hand grip of the water faucet. A screwed tube with a C-shaped section is connected to the valve seat below the two water inlet tubes and the water outlet tube, which allows the valve seat to be lock assembled to the flat surface of a washing table, a washing basin, or an applicable device. In addition, the water outlet tube is located next to the space between the two water inlet tubes, and the three tubes are arranged in a triangle shape. There are slits located at the same height of the outer periphery of the water inlet tubes and the water outlet tube, and the slits are properly aligned to allow the position limiting member to be interposed into the slits. These slits have slightly budged dots, located at opposing top and bottom surfaces at preset places of the slits. There are three water guiding ducts and each water guiding duct has a connector collar which is installed with a sealing ring at its top end and has at least one ring slot, with one water guiding duct for water output by connecting to a kitchen type sprinkler head or shower head, and the other two for providing hot and cold water input by controlled flow of either cold water, hot water, or an appropriate mixture of both. The position limiting member comprises a horizontal holding plate in its center, which extends in both left and right directions and both ends expand to form two shoulder portions. Each shoulder portion has a semi-circular concaved first slot located at its front end, and a second U-shaped slot is formed between the two first slots and extends towards the holding plate. The edges of openings of the second slot are slightly expanded to facilitate the fitting in of a water guiding duct, and the center portion of the second slot has an arc-shaped positioning limiting slot located at each of two sides of the second slot and these arc-shaped slots function in restricting the positioning of the water guiding duct. Furthermore, the position limiting member also has two slightly bulged dots located at both the top and the bottom surfaces at preset places. The above described is the brief description of one specific embodiment of the novel and improved water guiding duct positioning structure of the present invention.

The water guiding duct positioning structure of the present invention has the following advantages over the conventional structure: (a) the interposition of the position limiting member into the slits stabilizes the water guiding ducts, which does not require further components to fix and turn the water guiding ducts, thereby allowing the installation and operation within a rather limited space, and allowing quicker, more simplified, and more convenient assembly of the water guiding ducts; (b) the position limiting member stabilizes the water guiding ducts with its first slots or second slot, which provides an almost full-circle stabilization and a dramatically enhanced positioning strength to the water guiding ducts which in turn prevents the water guiding ducts to shift as a result of the force generated by high water pressure, thereby allowing the end of water guiding ducts to be stably connected to the valve seat to avoid potential water leak.

BRIEF DESCRIPTION OF THE DRAWINGS

FIG. 9 is a cross sectional view of another embodiment of the water guiding duct positioning structure of present invention when the position limiting member is not interposed into the slits.

FIG. 10 is a cross sectional view of another embodiment of the water guiding duct positioning structure of present invention when the position limiting member is interposed into the slits.

DETAILED DESCRIPTION OF THE INVENTION

The detailed description set forth below is intended as a description of the presently exemplary devices provided in accordance with aspects of the present invention and is not intended to represent the only forms in which the present invention may be prepared or utilized. It is to be understood, rather, the same or equivalent functions and components may be accomplished by different embodiments that are also intended to be encompassed within the spirit and scope of the invention.

Figure 1:
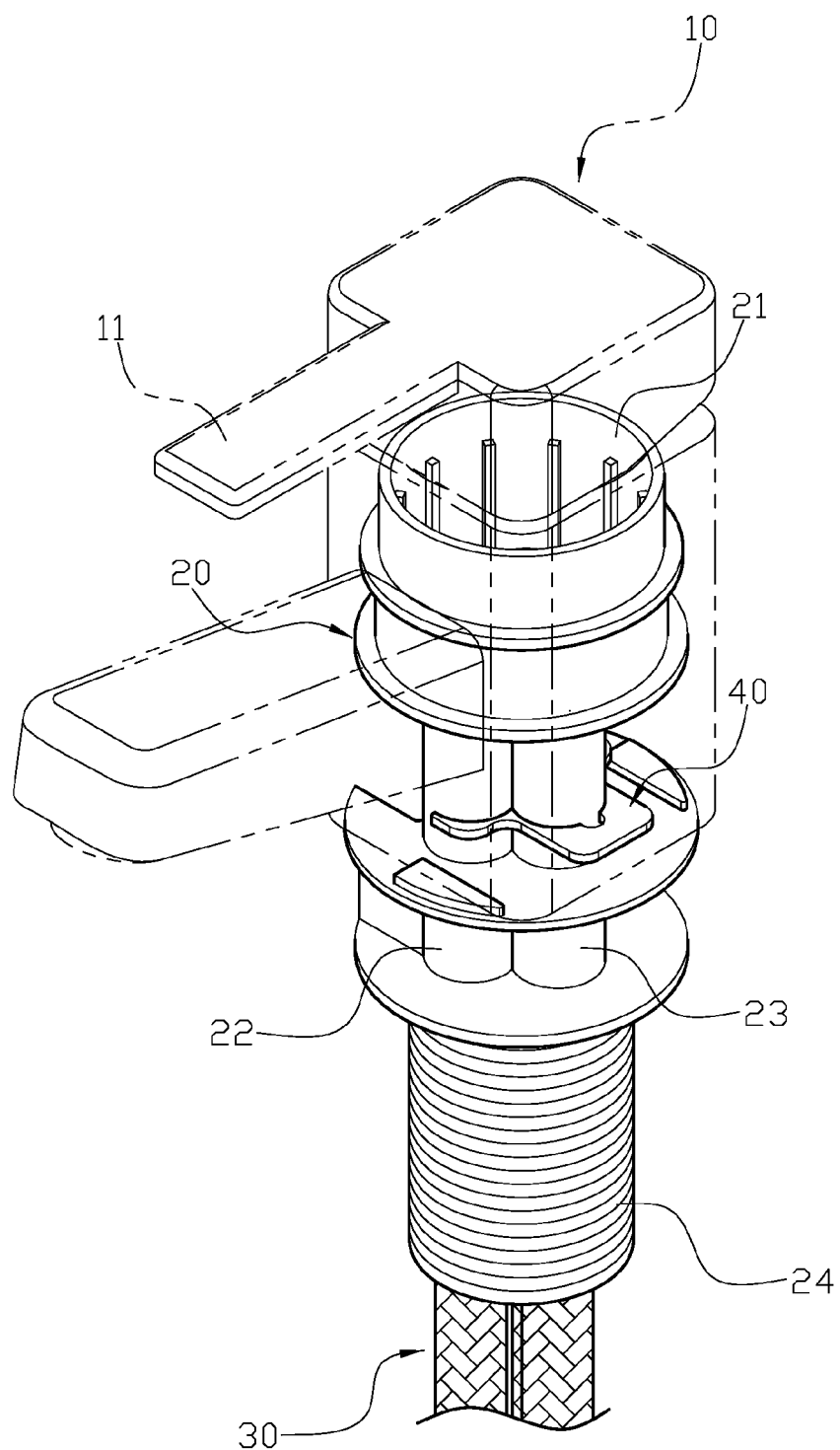
FIG. 1 is a three-dimensional combinational view of the water guiding duct positioning structure of present invention.
Figure 2:
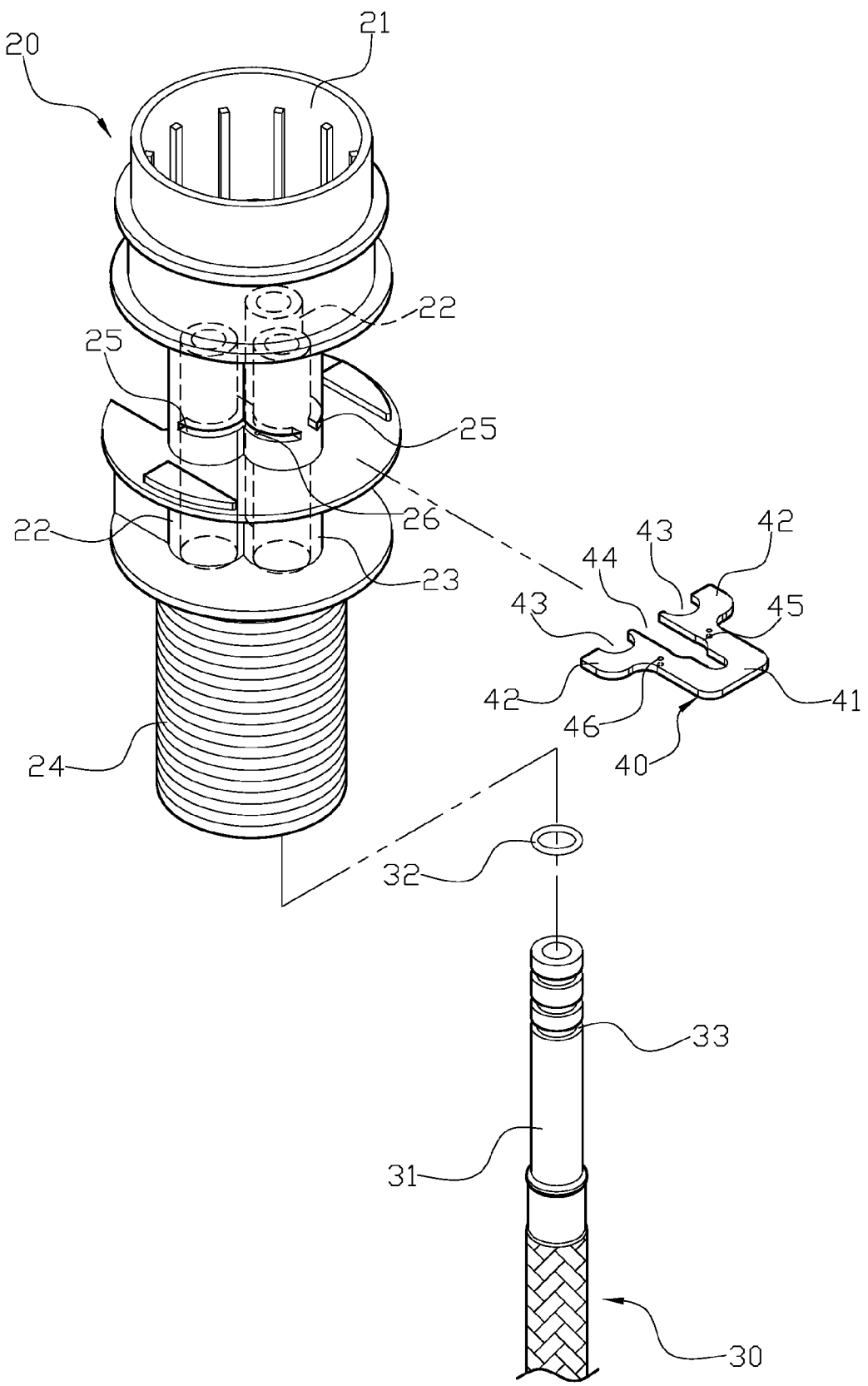
FIG. 2 is an exploded perspective view of the water guiding duct positioning structure of present invention.
Figures 3, 4:
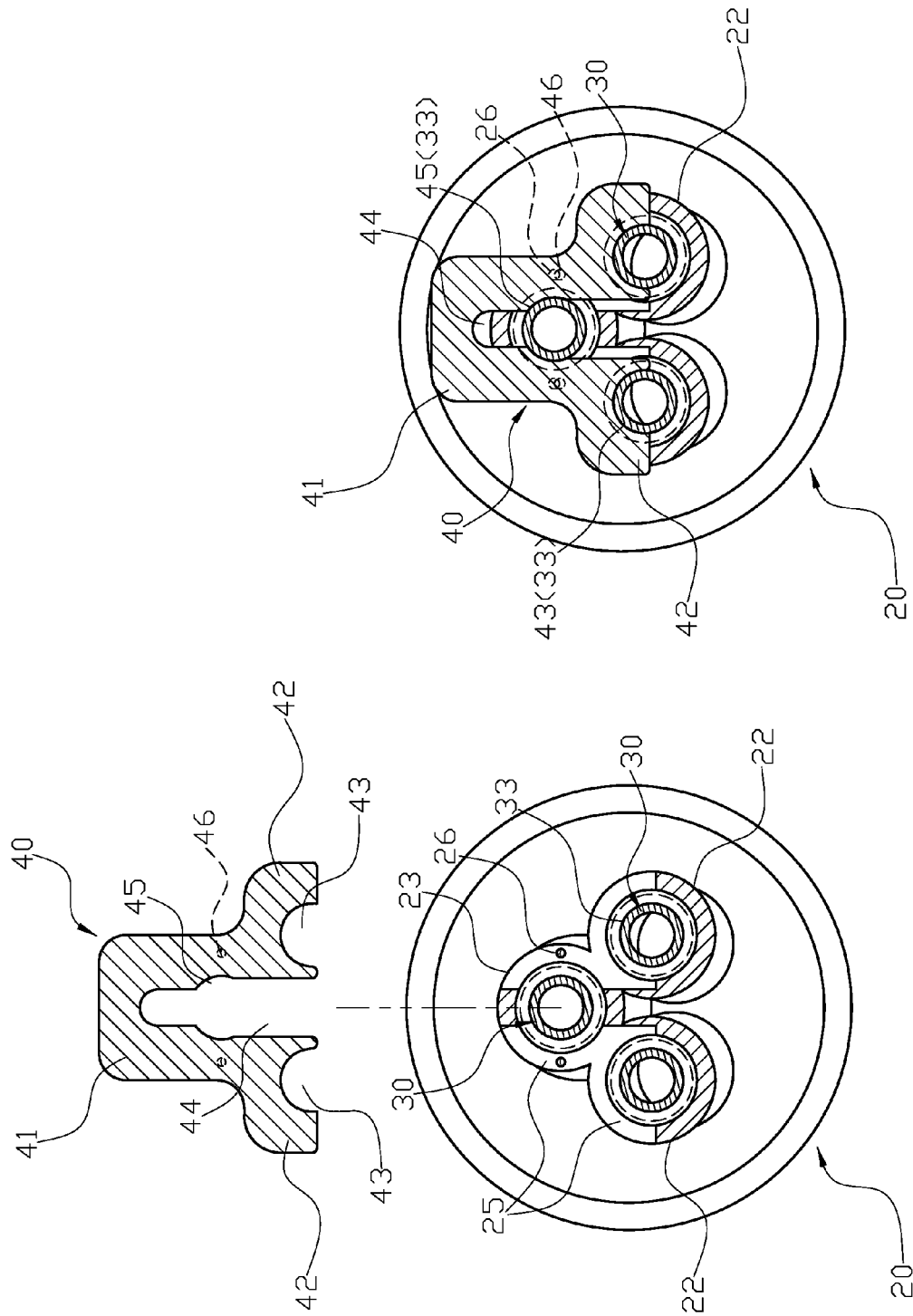
FIG. 3 is a sectional view of the water guiding duct positioning structure of present invention when the position limiting member is not interposed into the slits.
FIG. 4 is a cross sectional view of the water guiding duct positioning structure of present invention when the position limiting member is interposed into the slits.

The water guiding duct positioning structure of the present invention, as illustrated in FIGS. 1 to 3, comprises: a valve seat 20 placed inside of a water faucet 10, at least two water guiding ducts 30, and a position limiting member 40, wherein a concaved valve chamber 21 is located at the top portion of the valve seat 20 for holding the valve control components, and the bottom portion of the valve member 21 is connected with two water inlet tubes 22 and a water outlet tube 23, and the two water inlet tubes 22 and the water outlet tube 23 are all connected to the valve chamber 21, thereby allowing control of the water flow and the water temperature by adjusting the flow rate of water from the hot and cold water inlet tubes 22 by manipulating the hand grip 11 of the water faucet 10. A screwed tube 24 with a C-shaped section is connected to the valve seat 20 below the two water inlet tubes 22 and the water outlet tube, which allows the valve seat 20 to be lock assembled to the flat surface of a washing table, a washing basin, or another applicable device. In addition, the water outlet tube 23 is located next to the space between the two water inlet tubes 22, and these three tubes are arranged in a triangle shape. There are slits 25 located at the same height of outer peripheries of the preset places of the water inlet tubes 22 and the water outlet tube 23, and the slits 25 are properly aligned to allow the position limiting member 40 to be interposed into the slits 25. The slits 25 have slightly budged dots, located at opposing top and bottom surfaces at preset places of the slits. There are three water guiding ducts 30 and each water guiding duct has a connector collar 31 which is installed with a sealing ring 32 at its top end and has at least one ring slot 33, with one water guiding duct being used for water output by connecting to a kitchen type sprinkler head or shower head, and the other two for providing hot and cold water input by controlled flow of either cold water, hot water, or an appropriate mixture of both. The position limiting member 40 comprises a horizontal holding plate 41 in its center, which extends to its left and right directions and both ends expand to form two shoulder portions 42. Each shoulder portions 42 has a semi-circular concaved first slot 43 located in its front end, and a second U-shaped slot 44 is formed between the two first slots 43 and extends towards the holding plate 41. The edges of openings of the second slot 44 are slightly expanded to facilitate the fitting in of the water guiding duct 30, and the center portion of the second slot 44 has an arc-shaped positioning limiting slot 45 located at each of two sides of the second slot 44 and these arc-shaped slots 45 function in restricting the positioning of the water guiding duct 30. The presence of the second slot 44 also allows the holding plate 41 to slightly expand elastically towards the outside. Furthermore, the position limiting member 40 also has two slightly bulged dots 46 located at both the top and the bottom surfaces at preset places.

Figure 5:
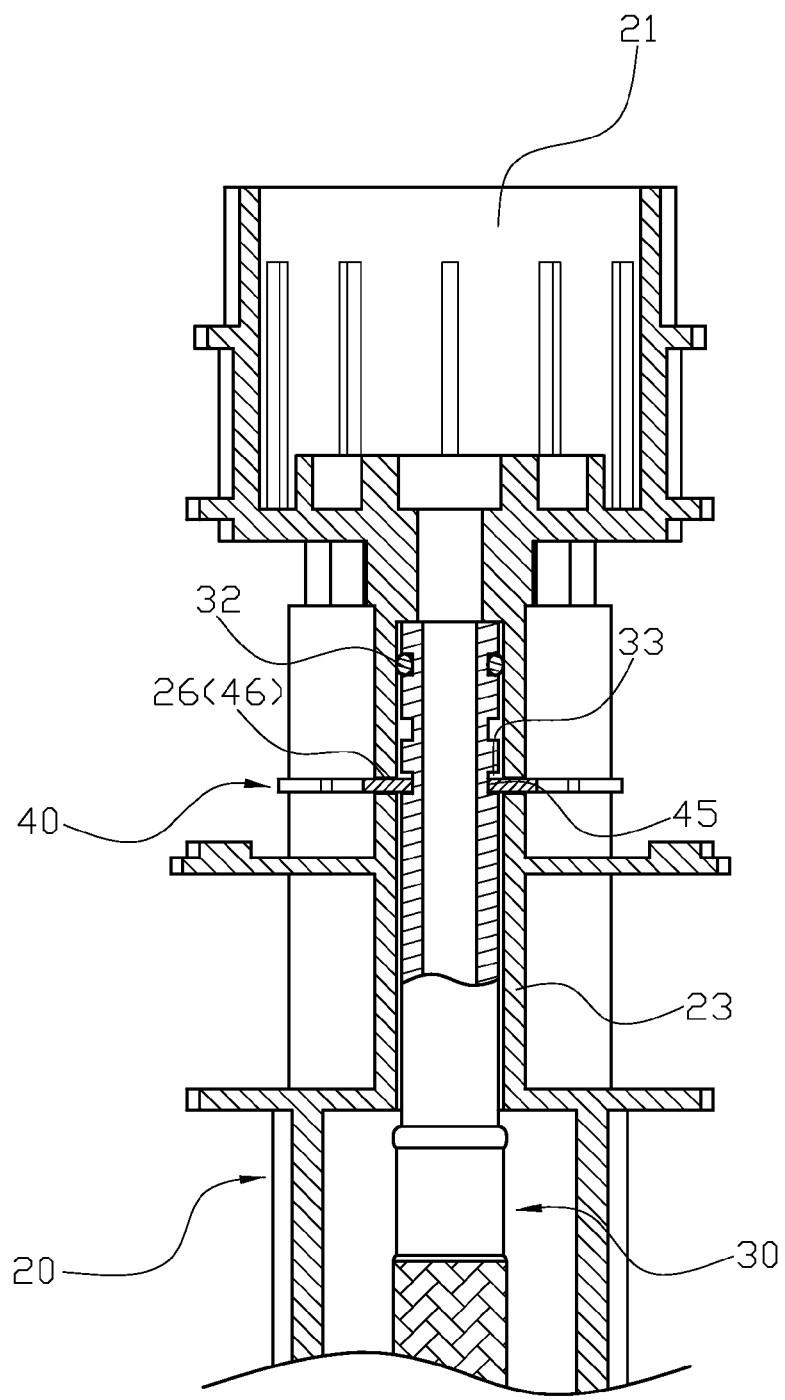
FIG. 5 is a longitudinal sectional view of the water guiding duct positioning structure of present invention when the position limiting member is interposed into the slits.
Figure 6:
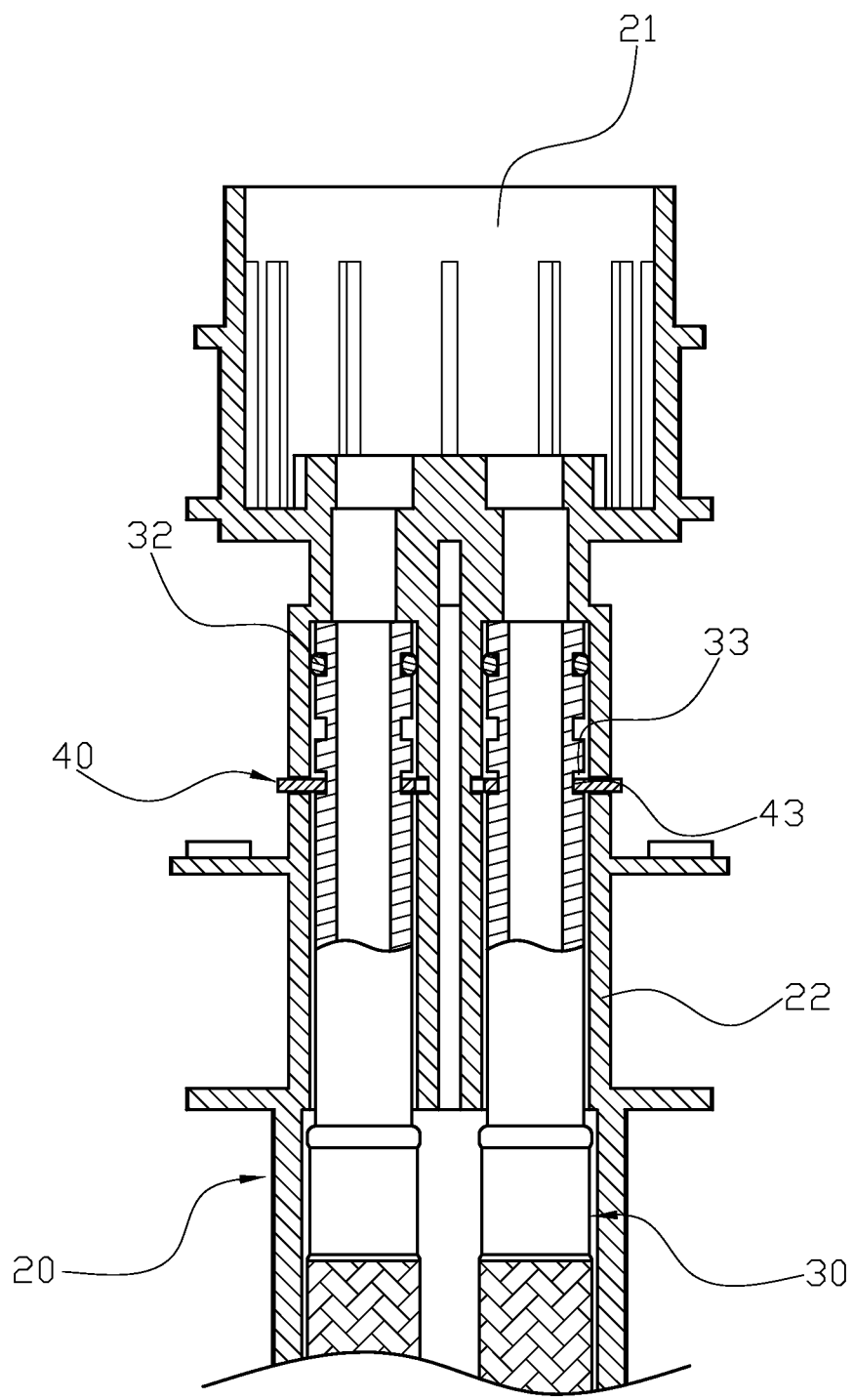
FIG. 6 is another longitudinal sectional view of the water guiding duct positioning structure of present invention when the position limiting member is interposed into the slits.

The assembly of the water guiding duct positioning structure of the present invention is illustrated in FIGS. 4 to 6. The water guiding ducts 30 are inserted into the two water inlet tubes 22 or also into the water outlet tube 23 from the bottom, and are positioned to allow the ring slot 33 of the water guiding duct 30 to fit the slits 25 of the water inlet tubes 22 and the water outlet tube 23, thereby when the position limiting member 40 is inserted with its first slots 43 and second slot 44 into the space between the water inlet tubes 22 and the water outlet tube 23 via the slits 25, the slightly bulged dots 46 of the position limiting member 40 are forced across the slightly bulged dots 26 located in the slits 25, which generates a stopping effect to prevent mutual dislocation. The position stabilizing effect together with the position limiting role of the first slot 43 to the water guiding ducts 30 of the two water inlet tubes 22 by buckling around the ring slot 33, or together with the expanded opening and the arc-shaped concaved slots 45 of the second slot 44, to simultaneously provide an almost full-circle stabilization to the ring slots 33 of the three water guiding ducts 30. This allows the two water guiding ducts 30 to be connected to the water inlet tubes 22, or also allows another water guiding duct 30 to be connected to the water outlet tube 23, thereby allowing the valve base 20 of the water faucet 10 to selectively function with two water guiding ducts or with three water guiding ducts. This completes the assembly of the water guiding duct positioning structure of the present invention.

Figure 7:
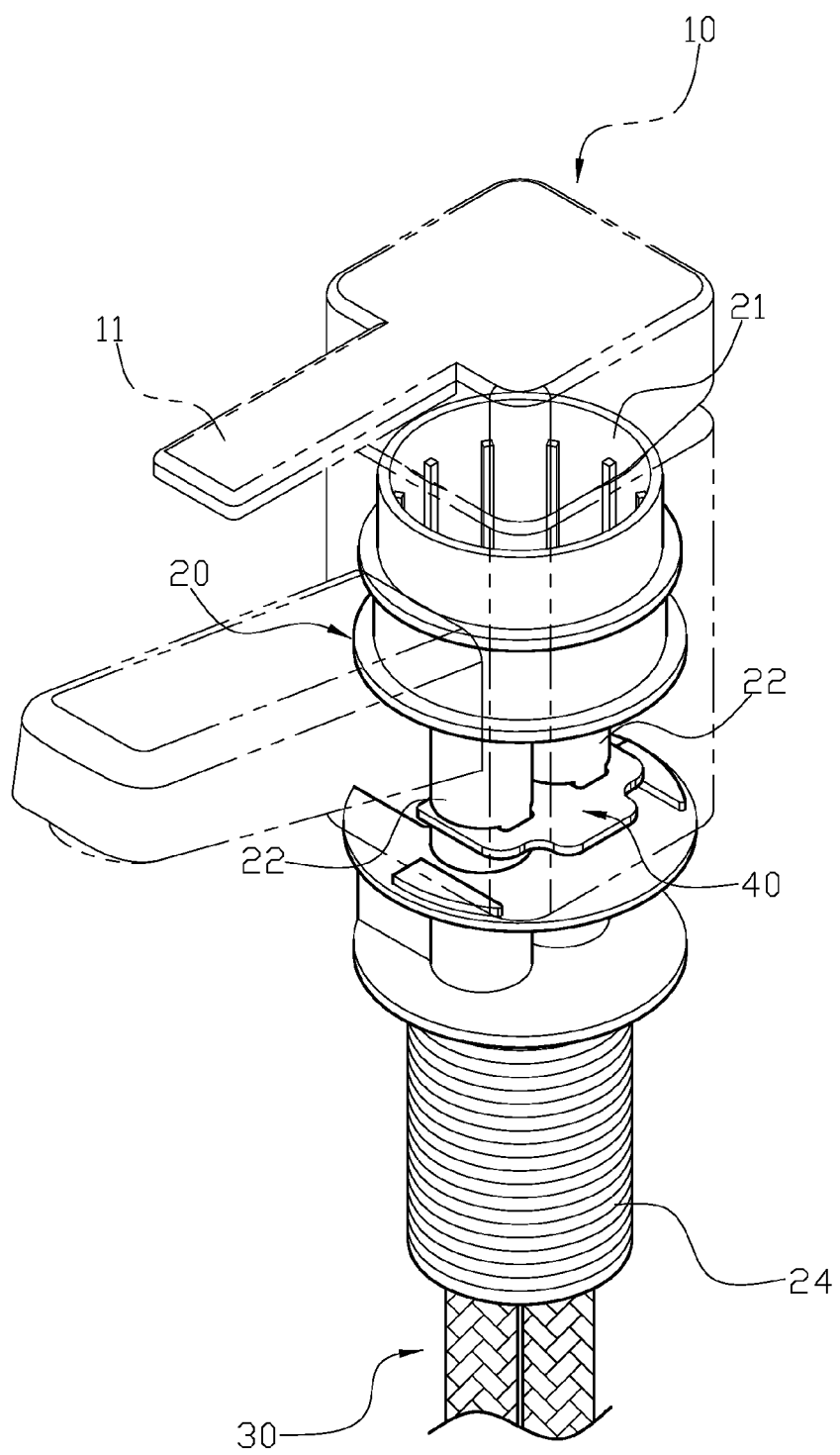
FIG. 7 is a three-dimensional combinational view of another embodiment of the water guiding duct positioning structure of present invention.
Figure 8:
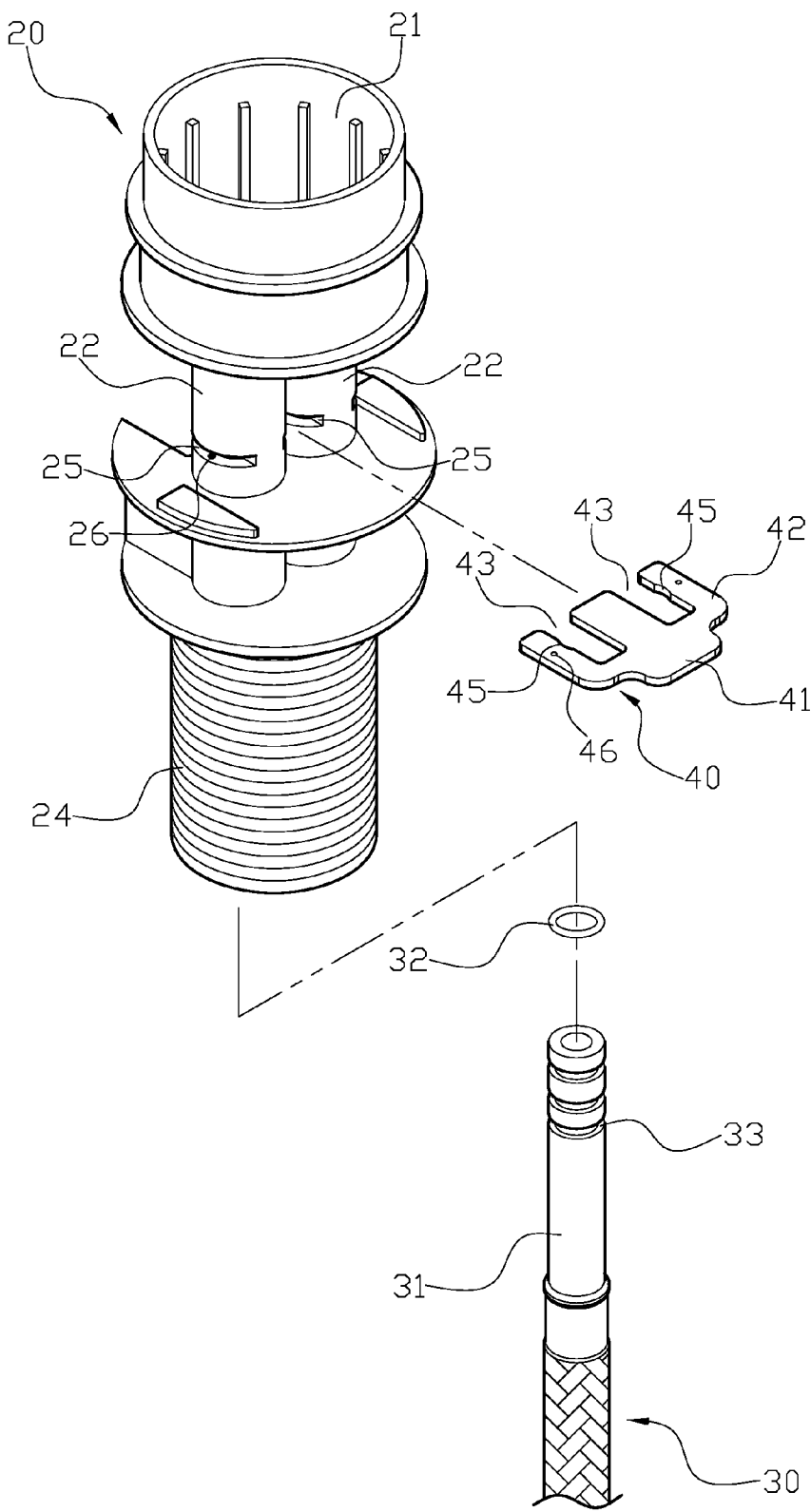
FIG. 8 is an exploded perspective view of another embodiment of the water guiding duct positioning structure of present invention.
Figure 11:
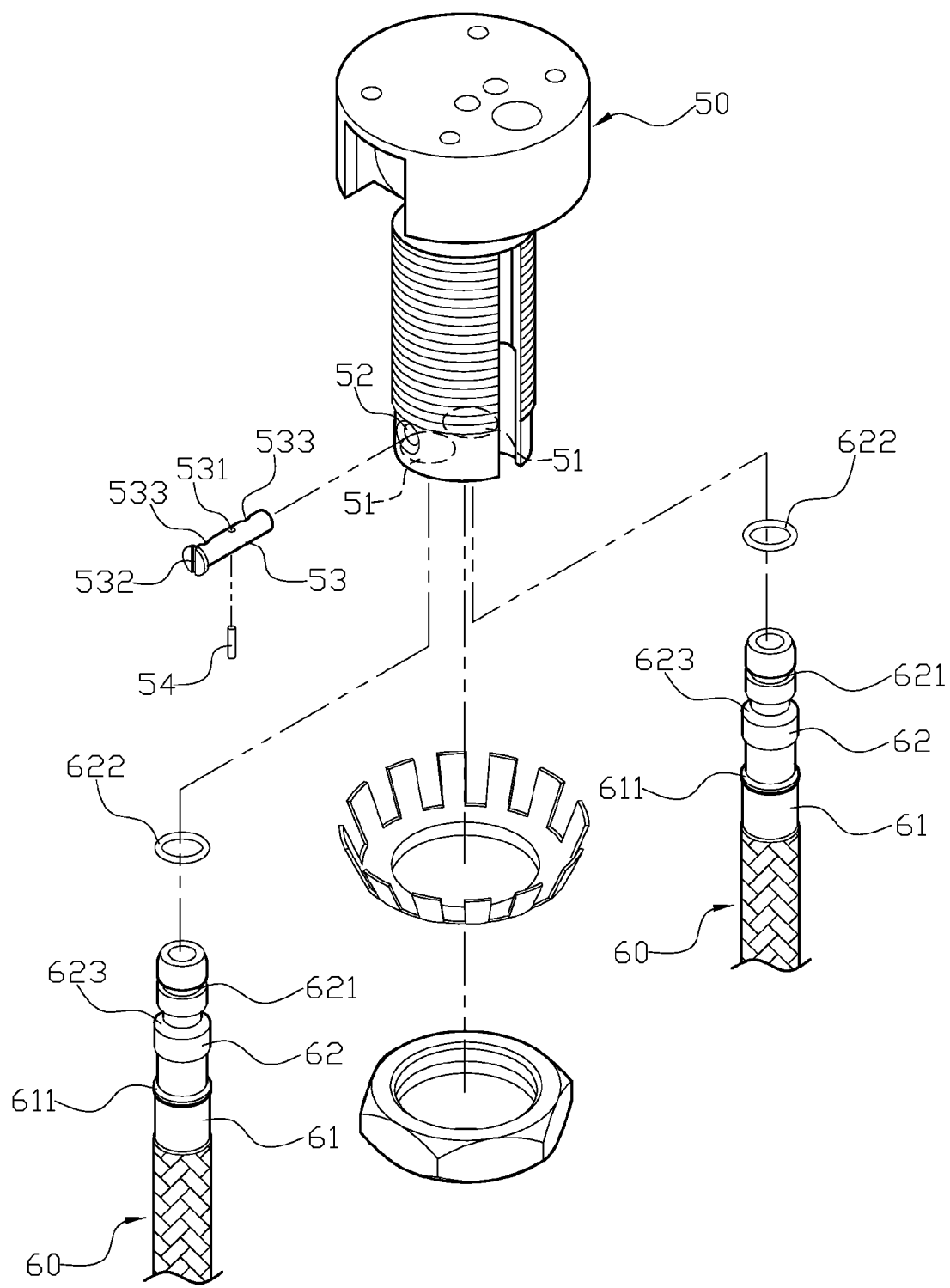
FIG. 11 is an exploded perspective view of a conventional water guiding duct positioning structure.
Figure 12:
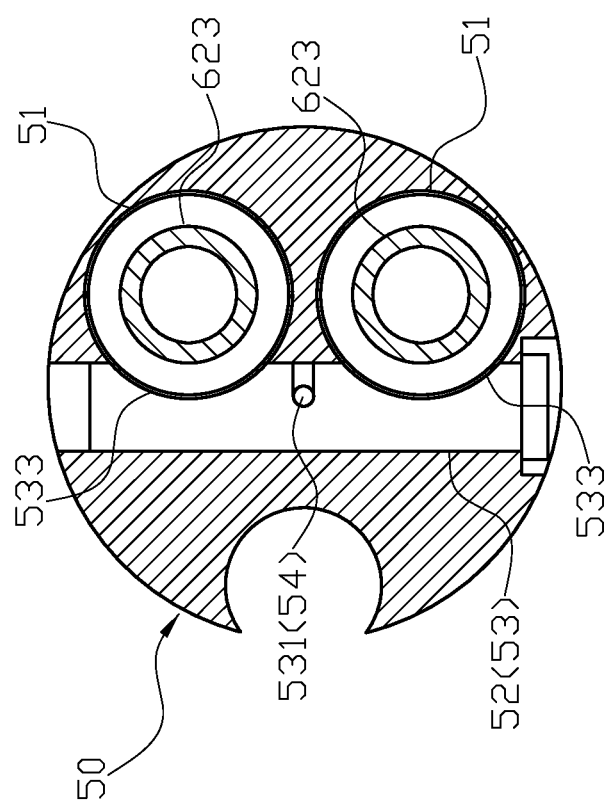
FIG. 12 is a diagram of the conventional water guiding duct positioning structure with the locking bolt being interposed but not locked.
Figure 13:
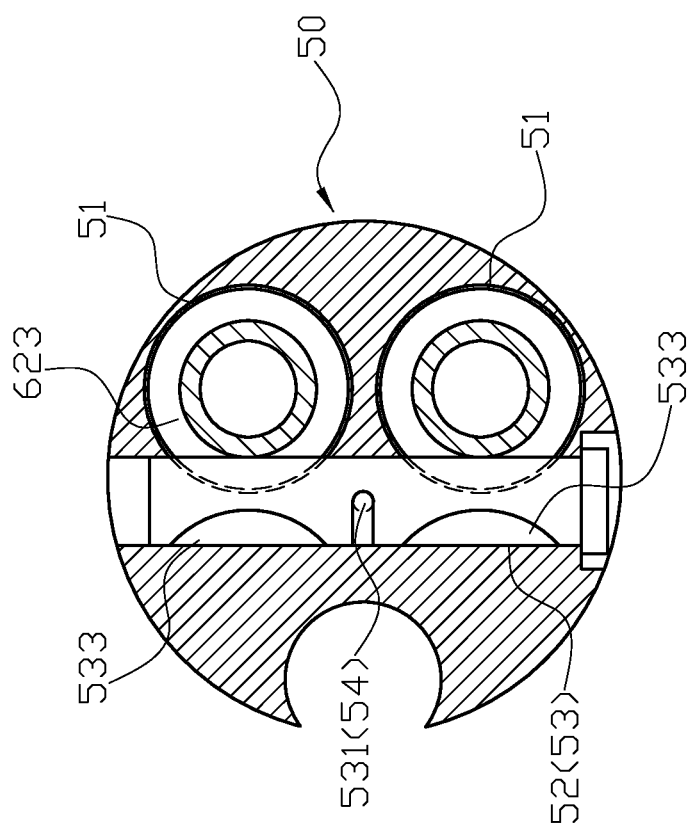
FIG. 13 is a diagram of the conventional water guiding duct positioning structure with the locking bolt being interposed and locked.

Another embodiment of the water guiding duct positioning structure of present invention, as illustrated in FIGS. 7 to 9, comprises a valve seat 20 located inside of the water faucet 10, two water guiding ducts 30, and a position limiting member 40, wherein a concaved valve chamber 21 is located at the top portion of the valve seat 20 and holds valve control components, and the bottom portion of the valve seat 20 is connected with two water inlet tubes 22. The two water inlet tubes 22 are connected to the valve chamber 21, which allows control of the water flow and the water temperature by adjusting the flow rate of water from the hot and cold water inlet tubes 22 with the hand grip 11 of the water faucet 10. The water inlet tubes 22 are connected with a screwed tube 24 which has a C-shaped section and is located below the water inlet tubes 22, and the screwed tube 24 allows the valve seat 20 to be lock assembled to the flat surface of a washing table, a washing basin, or another applicable device. There are slits 25 located at the preset places of the outer periphery of and at the same height of the water inlet tubes 22, and the slits 25 are properly aligned to allow the position limiting member 40 to be interposed. In addition, the slits 25 have slightly budged dots 26 that are located at opposing top and bottom surfaces at the preset places of the slits. The two water guiding ducts 30 each has a connector collar 31 which is installed with a sealing ring 32 at its top end and has at least one ring slot 33, with the two water guiding ducts 30 for providing input of hot and cold water by controlled flow of either cold water, hot water, or an appropriate mixture of cold and hot water. The position limiting member 40 comprises a horizontal holding plate 41 in its center, which extends in both left and right directions and both ends expand to form two shoulder portions 42. Each shoulder portion 42 has a U-shaped concaved first slot 43 extending towards the horizontal holding plate 41 of the position limiting member 40. Each first slot 43 has an arc-shaped concaved position limiting slot 45 at the center portion of the outer edge of the first slot 43, and each such outer edge of the first slot 43 has slightly bulged dots 46 located at the preset places of both the top and bottom surfaces of the position limiting member 40.

Assembly of another embodiment of the water guiding duct positioning structure of the present invention is illustrated in FIGS. 7 to 10. The two water guiding ducts 30 are inserted from the bottom into the two water inlet tubes 22 that are connected to the valve seat 20, and the ring slots 33 of the water guiding ducts 30 are aligned properly with the slits 25 located at preset locations of the outer periphery of the water inlet tubes 22, therefore when the position limiting member 40 is interposed into the slits 25 of the water inlet tubes 22 with its first slots 43, the slightly bulged dots 46 of the position limiting member 40 are forced across the slightly bulged dots 26 of the slits 25, which generates a stopping effect that prevents mutual dislocation. This effect together with the process that the water guiding duct 30 located inside of the water inlet tubes 22 being forced into the first slot 43 in an elastic manner, and being stabilized as the ring slot 33 of the water guiding duct 30 is buckle stabilized with the arc-shaped concaved slot 45 result in a secure connection of the water guiding ducts 30 to the water inlet tubes 22.

The water guiding duct positioning structure of present invention has multiple advantages over conventional structure as: (a) the interposition of the position limiting member 40 into the slits 25 of the water inlet and outlet tubes effectively stabilizes the water guiding ducts 30, which does not require further components to fix the water guiding ducts 30 or rational operation of any components for assembly, thereby allowing the operation to be readily performed within a rather limited space, and allowing quicker, more simplified, and more convenient assembly of the water guiding ducts 30; (b) the position limiting member 40 stabilizes the water guiding ducts 30 with its first slots or second slot, which provides almost a full-circle buckling stabilization and a dramatically enhanced positioning strength to the water guiding ducts 30 which prevents the water guiding ducts 30 to shift as a result of the force generated by high water pressure, thereby allowing the end of water guiding ducts 30 to be stably connected to the valve seat 20 and preventing water leak.

The above description and illustrations are for one or more exemplary embodiments of the present invention and should not be considered to limit the scope of the implementation of the present invention. Accordingly, the present invention is not to be considered as limited by the forgoing description, but includes any equivalents.

What is claimed is:

1. A water guiding duct positioning structure in a faucet valve base comprising a valve seat located inside of the faucet, at least two water guiding ducts, and a position limiting member, wherein a valve chamber is located at upper portion of the valve seat to receive a water control valve, bottom portion of the valve seat is connected with two water inlet tubes and a water outlet tube, and said two water inlet tubes and water outlet tube are connected with the valve chamber, so that water flow rate and water temperature are adjustable by said water control valve through a handle of the faucet;

wherein said water guiding duct has a connector collar at one end, and the connector collar has a water sealing ring and at least one ring slot;

wherein outer periphery of the two water inlet tubes and water outlet tube have horizontal slits connecting with each other, the slits provided for the position limiting member to plug in, and the slits having two aligned protruding portions at a predetermined portion in the slits;

wherein the position limiting member has a horizontal holding plate, one end of which has a shoulder portion extending both sides from the holding plate, and each shoulder portion has two first slots and a second slot located between the two first slots, and the second slot has two arc-shaped position limiting slots located at both sides of center portion of the second slot, and top and bottom surfaces of the position limiting member have protruding dots;

wherein when the water guiding ducts are inserted into the two water inlet tubes from a bottom portion thereof, the ring slot of the water guiding duct is configured to align with the slits of the two water inlet tubes and the water outlet tube, and when the position limiting member is inserted into the slits of the water inlet tubes and the water outlet tube, the protruding dots of the position limiting member are forced across the protruding portions of the slits to generate a stopping effect that prevents misalignment, and the first slots further engages with the ring slots of the water guiding duct, so that the arc-shaped position limiting slots and the first slots are configured to simultaneously secure said two water inlet tubes and the water outlet tube to enable the water guiding duct to be connected to the water inlet tubes.

2. The water guiding duct positioning structure in a faucet valve base of the claim 1, wherein the water inlet tubes and the water outlet tube are connected with a screwed tube which has a C-shaped section.

3. The water guiding duct positioning structure in a faucet valve base of the claim 1, wherein the water outlet tube is located between the two water inlet tubes, so the water inlet tubes and water outlet tube are arranged in a triangle shape.

4. The water guiding duct positioning structure in a faucet valve base of the claim 1, wherein when the valve seat is connected with three water guiding ducts, one is used for water output, and the other two are for providing input of hot and cold water to allow output of either cold or hot water, or a mixture of cold and hot water.

5. The water guiding duct positioning structure in a faucet valve base of the claim 1, wherein the first slot of the position limiting member is semi-circular, and the second slot of the position limiting member is U-shaped.

6. The water guiding duct positioning structure in a faucet valve base of the claim 1, wherein openings of the second slot are slightly expanded to facilitate insertion of the water guiding duct.

* * * * *